United States Patent
Okishio et al.

(10) Patent No.: US 11,939,136 B2
(45) Date of Patent: Mar. 26, 2024

(54) COMPOSITE LIQUID AGENT PACKAGE AND METHOD FOR MANUFACTURING SAME, AND KIT FOR PREPARING MULTICOMPONENT LIQUID COMPOSITION USING THE COMPOSITE LIQUID AGENT PACKAGE AND METHOD FOR MANUFACTURING SAME

(71) Applicant: Tokuyama Dental Corporation, Tokyo (JP)

(72) Inventors: Kazuhiko Okishio, Tokyo (JP); Yasuhiro Ogawa, Tokyo (JP)

(73) Assignee: Tokuyama Dental Corporation, Tokyo (JP)

( * ) Notice: Subject to any disclaimer, the term of this patent is extended or adjusted under 35 U.S.C. 154(b) by 375 days.

(21) Appl. No.: 17/423,048

(22) PCT Filed: Dec. 19, 2019

(86) PCT No.: PCT/JP2019/049926
§ 371 (c)(1),
(2) Date: Jul. 14, 2021

(87) PCT Pub. No.: WO2020/158238
PCT Pub. Date: Aug. 6, 2020

(65) Prior Publication Data
US 2022/0127059 A1 Apr. 28, 2022

(30) Foreign Application Priority Data
Jan. 31, 2019 (JP) .................................. 2019-015432

(51) Int. Cl.
*B65D 81/32* (2006.01)
*A61C 5/68* (2017.01)
*A61C 19/00* (2006.01)
*A61J 1/10* (2006.01)
*B65D 75/58* (2006.01)

(52) U.S. Cl.
CPC ............ *B65D 81/3261* (2013.01); *A61C 5/68* (2017.02); *A61C 19/005* (2013.01); *A61J 1/10* (2013.01);
(Continued)

(58) Field of Classification Search
CPC .. A61C 5/00; A61C 5/68; A61C 19/00; A61C 19/005; A61C 19/06; A61J 1/05;
(Continued)

(56) References Cited

U.S. PATENT DOCUMENTS 3,887,346 A * 6/1975 Erdman ............. B65D 81/3484
62/4
4,540,089 A * 9/1985 Maloney ................ B65D 31/12
206/219
(Continued)

FOREIGN PATENT DOCUMENTS

JP          63-28673 U1     2/1988
JP          6-262709 A      9/1994
(Continued)

OTHER PUBLICATIONS

International Search Report (ISR) dated Mar. 17, 2020 filed in PCT/JP2019/049926.

*Primary Examiner* — Bryon P Gehman
(74) *Attorney, Agent, or Firm* — RANKIN, HILL & CLARK LLP

(57) ABSTRACT

A composite liquid agent package containing a first pouch filled with a first liquid and a second pouch filled with a second liquid; and a kit for preparing a multicomponent composition, the kit including an outer bag housing the composite liquid agent package. With an opposite end section of the first pouch and an opposite end section of the second pouch being superposed, the superposed parts are heated and pressurized to exclude sealants, which are pres-
(Continued)

ent within the opposite end sections, outwardly of the extremities of the outer layers of the opposite end sections, while heat-fusing the two extruded sealants together to join the two pouches.

16 Claims, 9 Drawing Sheets

(52) U.S. Cl.
CPC ..... B65D 75/5816 (2013.01); B65D 75/5827 (2013.01)

(58) Field of Classification Search
CPC ........... A61J 1/10; B65D 75/48; B65D 75/58; B65D 75/5816; B65D 75/5827; B65D 75/60; B65D 81/32; B65D 81/3261; B65D 81/3272
See application file for complete search history.

(56) References Cited

U.S. PATENT DOCUMENTS

| | | | | |
|---|---|---|---|---|
| 4,856,651 | A | * | 8/1989 | Francis, Jr. ........ B65D 81/3272 62/530 |
| 5,423,421 | A | * | 6/1995 | Inoue ..................... A61J 1/00 604/416 |
| 2002/0086806 | A1 | * | 7/2002 | Giblin ................ B65D 81/3261 510/296 |
| 2004/0134802 | A1 | | 7/2004 | Inoue et al. |
| 2017/0340423 | A1 | | 11/2017 | Okishio et al. |
| 2018/0282048 | A1 | | 10/2018 | Hayman et al. |

FOREIGN PATENT DOCUMENTS

| | | |
|---|---|---|
| JP | 2002-136570 A | 5/2002 |
| JP | 2015-48146 A | 3/2015 |
| WO | 2016/104406 A1 | 6/2016 |

* cited by examiner

COMPOSITE LIQUID AGENT PACKAGE AND METHOD FOR MANUFACTURING SAME, AND KIT FOR PREPARING MULTICOMPONENT LIQUID COMPOSITION USING THE COMPOSITE LIQUID AGENT PACKAGE AND METHOD FOR MANUFACTURING SAME

TECHNICAL FIELD

This invention relates to a composite liquid agent package for storing the constituent components of a multicomponent liquid composition integrally in separate packages containing two or more liquid agents, respectively, the multicomponent liquid composition being a composition which exhibits a predetermined function, for example, such as a dental adhesive composition and which, when prepared upon mixing of its all components, performs its function to change its form, or becomes unstable; and a method for manufacturing the composite liquid agent package.

The present invention also relates to a kit for preparing the multicomponent liquid composition by mixing a plurality of the integrally stored liquid agents with the use of the composite liquid agent package.

BACKGROUND ART

A dental adhesive generally comprises a polymerizable monomer including a polymerizable monomer having an acidic group, and a polymerization initiator for polymerizing and curing the polymerizable monomer. As the polymerization initiator, a chemical polymerization initiator which functions without requiring photo irradiation or heating may be used. The chemical polymerization initiator contains a combination of a plurality of components such as a reducing agent and an oxidizing agent which, upon contact, can immediately react. Thus, these components need to be stored as two or more divided parts. For this purpose, the dental adhesive using the chemical polymerization initiator is generally prepared by dividing the polymerizable monomer component, as appropriate, in conformity with the division of the chemical polymerization initiator components, mix the polymerizable monomer component and the chemical polymerization initiator component, store the mixtures as a plurality of liquid compositions, and mix these separate liquid compositions when in use for preparation of the dental adhesive. A proposal has been made for a kit for convenience of such storage and preparation (the kit herein refers to a product obtained by combining two or more pharmaceuticals into an integral article for the purposes of lightening a burden during preparation, preventing contamination or intrusion of foreign matter, and so on).

Patent Document 1 shown below, for example, discloses, as the above kit, a package which can be applied advantageously to a two-component mixed adhesive. Such a package has both side edges and one end edge (lower end edge) closed throughout, and an applicator insertion portion and a pouch housing portion which are located laterally adjacently are defined inside the package. The upper end edge of the package is closed at its site corresponding to the pouch housing portion, but is open at its site corresponding to the applicator insertion portion. A first pouch filled with a first liquid of the two-component mixed adhesive, and a second pouch filled with a second liquid of the two-component mixed adhesive are housed, in a state superposed on each other, in the pouch housing portion. The first pouch and the second pouch each have one end edge (lower end edge) sealed so that it can be opened by applying a pressing force on the liquid filled therein. The first pouch and the second pouch each have an opposite end edge (upper end edge) tightly closed more strongly than the one end edge. These pouches are housed in the pouch housing portion of the package, with their one end edges facing downward. The package is manufactured by heat-fusing both side sections of a rectangular film or sheet to each other to form a tubular shape, and then heat-fusing one end section of the tubular material, while heat-fusing a part of an opposite end section thereof. Prior to heat-fusing the part of the opposite end section of the package, an opposite end section of the first pouch and an opposite end section of the second pouch are positioned between the front wall and the back wall of an upper end section of the package, and the part of the opposite end section of the package is heat-fused, whereby the opposite end section of the first pouch and the opposite end section of the second pouch are held by the opposite end section of the package.

In using the two-component mixed adhesive, a pressing force is exerted via the package on the first liquid filled in the first pouch and the second liquid filled in the second pouch to unseal the one end section of the first pouch, thereby flowing out the first liquid into a lower part of the package, and also to unseal the one end section of the second pouch, thereby flowing out the second liquid into the lower part of the package, so that the first liquid and the second liquid are mixed. Then, the applicator is loaded into the package through a non-sealed site of the opposite end edge of the package to adhere the mixed first liquid and second liquid to the leading end of the applicator. A required site of a patient is coated with the mixture with the use of the applicator.

PRIOR ART DOCUMENTS

Patent Documents

Patent Document 1: International Publication WO 2016/104406 A1

SUMMARY OF THE INVENTION

Problems to be Solved by the Invention

According to the inventors' experiences, however, the above-described package disclosed in Patent Document 1 is not yet fully satisfactory in terms of the manufacturing efficiency and the ease of use. Concretely, in connection with the manufacturing efficiency, the above package requires that the first pouch and the second pouch produced separately be superposed on each other as needed, and be positioned at a required site within the package prior to the heat fusion of the upper end section of the package. Work for fulfilling such requirements are relatively difficult and complicated, for example, for the following reasons: (1) The first pouch and the second pouch each have, as an inner layer, a sealant layer which is easily heat-fused (has heat-sealability) and, as an outer layer, a resin film layer, such as one of polyethylene terephthalate, silica vapor-deposited or aluminum-laminated because of needed gas barrier properties, mechanical characteristics, etc., but having no heat-sealability. Thus, it is difficult to heat-fuse the first pouch and the second pouch for integration beforehand. (2) It is impossible to heat-fuse the outer layers of the pouches to a sealant of the inner surface of the package. Hence, the opposite end section of the first pouch and the opposite end section of the second pouch are not heat-fused, but merely held mechanically, between the front wall and the back wall of the opposite end section of the package, and are liable to fall down to the lower part of the package. In regard to the ease of use, on the other hand, the following inconveniences may occur: (3) A part of the opposite end edge of the package is not closed. Thus, when the one end section of the first pouch is unsealed to flow out the first liquid to the lower part of the package, and the one end section of the second pouch is unsealed to flow out the second liquid to the lower part of the package, there is a risk that the first liquid and the second liquid will be accidentally splattered to the outside of the package. (4) The unclosed site of the opposite end edge of the package is relatively small, and its opening width is also narrow, so that the applicator is not necessarily easy to insert into the package.

The present invention has been accomplished in the light of the facts mentioned above. Its technical challenges are to solve, at least partly, the above-described problems existent in the package disclosed in Patent Document 1. That is, the technical challenges for the present invention are firstly to provide a composite liquid agent package for solving the above problems (1) and (2) confronting the combination of the first pouch and the second pouch; and a method for manufacturing the composite liquid agent package; and secondly to provide a kit for preparing a multicomponent liquid composition, the kit adapted to solve the above problems (3) and (4) with the above package; and a method for manufacturing the kit.

Means for Solving the Problems

The present inventors hit upon the idea of integrating the first pouch and the second pouch with the effective use of the sealant present within the opposite end section of each of the first and second pouches. Based on this idea, they conducted diligent studies. As a result, they have obtained the following findings: With the opposite end section of the first pouch and the opposite end section of the second pouch being superposed, their overlapping parts are heated and pressurized to extrude the sealants, present within the opposite end sections, outwardly of the extremities of outer layers of the opposite end sections, while the two extruded sealants are being heat-fused to each other, whereby the two pouches are joined together. This measure is used as a basic solution. Further, various means for solution are added to this basic solution as needed. By so doing, the aforementioned technical challenges can be achieved.

According to a first aspect of the present invention, there is provided a composite liquid agent package comprising a plurality of liquid agent housing portions and a binding portion, all of the plurality of liquid agent housing portions being bound together by the binding portion for integration, wherein each of the plurality of liquid agent housing portions includes a pouch constituted by a heat-sealable laminated film or heat-sealable laminated sheet including at least an inner layer composed of a sealant and an outer layer composed of a sheathing material, the pouch having one end section and an opposite end section which are sealed sections formed by heat-sealing the ends of the heat-sealable laminated film or heat-sealable laminated sheet; and a liquid agent held within the pouch airtightly and liquidtightly, the one end section is sealed so that it can be opened by applying a pressing force on the liquid agent filled, the liquid agents held in the plurality of liquid agent housing portions may be different from each other, and at the extremity of each of the opposite end sections of the plurality of liquid agent housing portions, a part of the sealant constituting the inner layer of the heat-sealable laminated film or heat-sealable laminated sheet constituting the liquid agent housing portion is extended outwardly of the extremity of the outer layer while keeping integral with a remaining part of the sealant to form an extended-out sealant, and the extended-out sealants are fusion-bonded together and integrated thereby to form a fused sealant, which constitutes the binding portion or a main part thereof.

The composite liquid agent package is preferably a composite liquid agent package for storing the constituent components of a multicomponent liquid composition, which exhibits a predetermined function, such as a dental adhesive composition, integrally in separate packages containing two or more liquid agents, respectively. In the composite liquid agent package, moreover, it is preferred that the pouches in the liquid agent housing portions be each a pillow flat bag. Furthermore, it is preferred that a penetrating opening is formed in each of the opposite end sections of the respective liquid agent housing portions constituting the plurality of liquid agent housing portions, and that each of the extended-out sealants fusion-bonded together in the binding portion includes the sealant extended out from the peripheral edge extremity of the penetrating opening formed in the opposite end section of each liquid agent housing portion toward the interior of the opening.

According to a second aspect of the present invention, there is provided a method for manufacturing the composite liquid agent package in which all of the pouches in the respective liquid agent housing portions are pillow flat bags, comprising:

a liquid agent housing portion-intended individual package provision step of providing a plurality of liquid agent housing portion-intended individual packages by vertical pillow packaging using a heat-sealable laminated film or heat-sealable laminated sheet including at least an inner layer composed of a sealant and an outer layer composed of a sheathing material, each of the liquid agent housing portion-intended individual packages being adapted to hold a liquid agent airtightly and liquidtightly inside a pouch comprising a pillow flat bag having a lower end side heat-sealed section as one end section, an upper end side heat-sealed section as an opposite end section and, further on a back surface thereof, a back sealed section formed by heat sealing, and a joining step of superposing all of the opposite end sections of the plurality of liquid agent housing portion-intended individual packages provided in the liquid agent housing portion-intended individual package provision step, and heating and pressurizing superposed regions of all the opposite end sections overlapping, to extrude a part of the sealant, which constitutes the inner layer in the superposed region of each of the opposite end sections, outwardly from the extremity of the outer layer of each of the opposite end sections, while fusion-bonding together extended-out sealants formed from the extruded sealants.

Preferably, in the liquid agent housing portion-intended individual package provision step, protrusions and depressions are provided in the upper end side heat-sealed section serving as the opposite end section, and the thickness of the sealant in the protrusion is larger than the thickness of the inner layer of the heat-sealable laminated film or heat-sealable laminated sheet.

According to a third aspect of the present invention, there is provided a kit for storing the constituent components of a multicomponent liquid composition, which exhibits a predetermined function, in separate packages containing two or more liquid agents, respectively, and for mixing, when in use, the liquid agents divided into the separate packages to prepare the multicomponent liquid composition, the kit including the composite liquid agent package according to claim 2, and an outer bag for fixing the composite liquid agent package inside and housing it airtightly, wherein the outer bag has a liquid reservoir space capable of holding all the liquid agents, which flow out when the liquid agents held in the liquid agent housing portions of the composite liquid agent package fixed and housed inside are flowed out from the one end sections of the liquid agent housing portions by application of a pressing force to the liquid agents, without bringing the liquid agents into contact with the composite liquid agent package.

In the kit for preparing the multicomponent liquid composition, it is preferred that the outer bag be constituted by a heat-sealable laminated film or heat-sealable laminated sheet including at least an inner layer comprising a sealant and an outer layer comprising a sheathing material, and that fixing of the composite liquid agent package to the interior of the outer bag be performed at the site of fusion bonding/fixing where the sealant constituting the inner layer of the outer bag and the integrated sealants of the binding portion in the composite liquid agent package are fusion-bonded together.

In the kit for preparing the multicomponent liquid composition according to the preferred embodiment, the pouch in each of the liquid agent housing portions is a pillow flat bag;

the outer bag is a pillow flat bag having an upper end sealed section, a lower end sealed section, and an outer bag back sealed section formed by heat sealing at an upper end section, a lower end section, and a back thereof, respectively;

the width of the pillow flat bag constituting the outer bag is larger by a predetermined length than the width of the pillow flat bag constituting the pouch in each of the liquid agent housing portions;

fixing of the composite liquid agent package to the interior of the outer bag is performed such that the site of fusion bonding/fixing is disposed, with one side end of the pillow flat bag constituting each of the pouches of the composite liquid agent package being parallel, at a predetermined space interval, to the side end, on the same side, of the pillow flat bag constituting the outer bag, in the upper end sealed section of the outer bag, and that a simple sealed section, where the sealants constituting the inner layer of the outer bag are fusion-bonded together, is formed in a region beside at least one side end of the upper end sealed section;

the front wall and the back wall, which face each other, of the pillow flat bag constituting the outer bag are formed with (1) a weakened line starting at a point located near the upper end edge of the simple sealed section of the upper end sealed section, and ending at a point located close to an upper part of the side end edge beside the simple sealed section in the outer bag; (2) a weakened line starting at a point located near the upper end edge of the simple sealed section of the upper end sealed section, and ending at a point located close to the upper part of the side end edge on the opposite side of the simple sealed section in the outer bag; or (3) a weakened line starting at a point located close to the upper part of the side end edge on one side, and ending at a point located close to the upper part of the side end edge on the opposite side, and the weakened line is broken to remove a part above the weakened line in the outer bag, whereby an applicator insertion opening is formed.

In case the weakened line (2) or (3) is formed, it is preferred that when the weakened line is broken to remove the part above the weakened line, a remaining part of the composite liquid agent package which remains after outflow of the liquid agents is removed together with the part above the weakened line in the outer bag.

According to a fourth aspect of the present invention, there is provided a method for manufacturing the preferred kit for preparing a multicomponent liquid composition in which each of the pouches in the respective liquid agent housing portions is a pillow flat bag, the method comprising:

a temporary fixing step of placing a strip-shaped base material, which comprises a heat-sealable laminated film or heat-sealable laminated sheet including at least an inner layer composed of a sealant and an outer layer composed of a sheathing material, such that the inner layer becomes an upper surface, arranging a plurality of the composite liquid agent packages on the upper surface, at predetermined space intervals in the longitudinal direction of the strip-shaped base material, at the widthwise center or at nearly the widthwise center of the strip-shaped base material such that the opposite end sections of the pouches in the liquid agent housing portions of the composite liquid agent package are orthogonal to the length direction of the strip-shaped base material, and temporarily fixing the packages;

a tubulation step of heat-sealing both side end section regions of the strip-shaped base material, which has the plurality of composite liquid agent packages temporarily fixed thereto at predetermined space intervals as a result of the temporary fixing step, in such a manner as to be parallel to the length direction, thereby joining them together to obtain a tubular body having the composite liquid agent packages arranged and temporarily fixed inside at the predetermined space intervals; and a bag shape formation step of heat-sealing a part, between the composite liquid agent packages temporarily fixed adjacent to each other, of the tubular body obtained in the tubulation step in a direction orthogonal to the longitudinal direction, thereby joining the part, and cutting the center or nearly the center of the joined part in the direction orthogonal to the longitudinal direction to obtain a pillow flat bag housing the single composite liquid agent package, the method further comprising fusion bonding an integrated fused sealant in the binding portion of the temporarily fixed composite liquid agent package, and the sealant constituting the inner layer of the strip-shaped base material to each other, during heat sealing in the bag shape formation step.

The above method preferably includes, prior to the bag shape formation step, a weakened line formation step of irradiating a predetermined position of the strip-shaped base material with a laser beam, thereby reducing the thickness of the strip-shaped base material to form the weakened line.

Effects of the Invention

In the present invention, all of the liquid agent housing portions of the composite liquid agent package are bound together at the binding portion, and integrated thereby. Hence, it is not necessary to individually handle the plurality of pouches housing the liquid agents, but it is possible to handle all of them as a single product. Thus, when they are housed in the outer bag to manufacture the kit, they can be placed at a required site sufficiently easily. If a bag made of a heat-sealable laminated film or heat-sealable laminated sheet is used as the outer bag, the sealant of the outer bag and the fused sealant of the binding portion can be fusion-bonded with simplicity and temporarily fixed. Therefore, the required site where the composite liquid agent package is placed at the time of kit manufacturing can be set optionally (the degree of flexibility in design can be enhanced). Moreover, positional deviation in the subsequent step can be prevented, so that the manufacturing yield can be increased. Furthermore, the temporarily fixed site undergoes proper fusion bonding, whereby the composite liquid agent package can be fixed. In the commercialized kit, therefore, the composite liquid agent package does not slip off.

In the multicomponent liquid composition preparing kit, on the other hand, the composite liquid agent package is housed liquidtightly and fixed within the outer bag. Thus, when a pressing force is exerted on the liquid agent held in each liquid agent housing portion of the composite liquid agent package to flow out the liquid agent from the one end section of each liquid agent housing portion, the liquid agent has no risk of being splattered to the outside of the outer bag. In the embodiment in which the weakened line is formed, moreover, the weakened line is broken after the outflow of the liquid agent from each liquid agent housing portion, whereby the insertion opening for inserting the applicator can be formed. The position where the composite liquid agent package is fixed can be set optionally. Thus, such positioning as to locate the composite liquid agent package near the insertion opening, for example, can enlarge the width (opening width) between both side walls, i.e., front wall and back wall, of the outer bag in the insertion opening, and can thus facilitate the insertion operation of the applicator. Unlike such an embodiment, there may be an embodiment in which when the weakened line is broken to remove the partial piece above the weakened line, the remaining part of the composite liquid agent package which remains after outflow of the liquid agent is removed together with the partial piece above the weakened line. In this case, only the liquid agent remains inside the outer bag, and no obstacle is present there. Consequently, the operation of stirring/mixing the liquid agents with the use of the applicator, or the operation of adhering the prepared multicomponent liquid composition to the applicator can be performed with ease.

MODE FOR CARRYING OUT THE INVENTION

Figure 1:
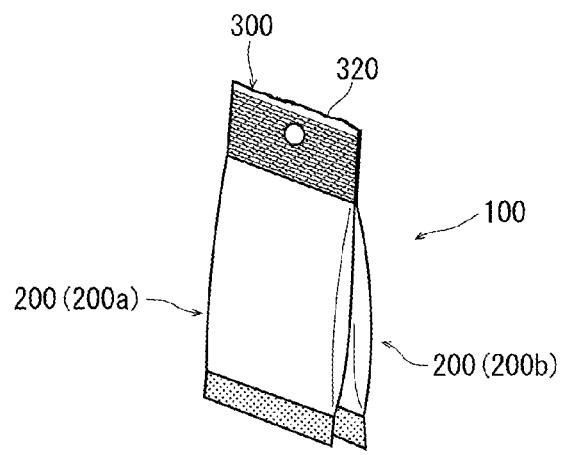
FIG. 1 is a perspective view showing a preferred embodiment of a composite liquid agent package constituted according to the present invention.

The present invention will be described in further detail by reference to the accompanying drawings showing preferred embodiments of the present invention.
<Composite Liquid Agent Package>
FIG. 1 shows a preferred embodiment of a composite liquid agent package constituted in accordance with the present invention. The composite liquid agent package, indicated entirely at a numeral 100, is designed to store a multicomponent liquid composition, which exhibits a predetermined function, integrally in separate packages containing two liquid agents, respectively. The multicomponent liquid composition divided into the separate packages, usually, contains "a combination of a plurality of components which, if coexistent, causes a reaction", such as "a combination of an oxidizing agent and a reducing agent" or "a combination of a hydrolyzable compound and water". The separate packaging is performed with the aim of dividing the components so that such a reaction does not occur during storage. A chemical polymerization initiator under a radical polymerization system, which is used in a dental adhesive composition, also belongs to the above "combination". If all the components constituting the chemical polymerization initiator are mixed together, radicals are generated and, in the co-presence of a polymerizable monomer, polymerization/curing begins. In a liquid composition containing a chemical polymerization initiator and a polymerizable monomer, therefore, the constituent components of the chemical polymerization initiator are formulated as two separate liquid agents and stored so that such a polymeric reaction will not take place.

As typical examples of the multicomponent liquid composition, there can be named a so-called two-component mixed dental adhesive (or adhesive material) consisting essentially of a polymerizable monomer including an acidic group-containing polymerizable monomer and a polymerizable monomer having no acidic group, a chemical polymerization initiator, and a water-soluble organic solvent and/or water. The components usable preferably in the two-component mixed dental adhesive (or adhesive material) are as follows:

As the acidic group-containing polymerizable monomer, there can be preferably used a compound having at least one acidic group, such as a phosphate group, a carboxyl group, a sulfonate group, or a phosphonate group, and at least one polymerizable unsaturated group, in one molecule, such as 2-(meth)acryloyloxyethyl dihydrogen phosphate ("(meth) acryloyl" refers to acryloyl or methacryloyl, and the same applies hereinafter), 10-(meth)acryloyloxydecyl dihydrogen phosphate, di[2-(meth)acryloyloxyethyl] hydrogen phosphate, di[10-(meth)acryloyloxydecyl] hydrogen phosphate, 4-(meth)acryloxyethyltrimellitic acid, 11-(meth)acryloyloxy-1,1-undecanedicarboxylic acid, 1,4-di(meth)acryloyloxypyromellitic acid, 2-(meth)acryloyloxyethylmaleic acid, 2-(meth)acryloyloxyethylphthalic acid, 2-(meth)acryloyloxyethylhexahydrophthalic acid, 2-methacrylamido-2-methylpropanesulfonic acid, 2-acrylamido-2-methylpropanesulfonic acid, p-vinylbenzenesulfonic acid, or vinylsulfonic acid.

As the polymerizable monomer having no acidic group, there can be preferably used 2-hydroxyethyl (meth)acrylate, 2-hydroxypropyl (meth)acrylate, glycerol di(meth)acrylate, 2,2'-bis{4-[3-(meth)acryloyloxy-2-hydroxypropoxy]phenyl}propane, 2,2'-bis[4-(meth)acryloyloxyphenyl]propane, 2,2'-bis[4-(meth)acryloyloxypolyethoxyphenyl]propane, 2,2'-bis[4-(meth)acryloyloxydiethoxyphenyl]propane, 2,2'-bis[4-(meth)acryloyloxytetraethoxyphenyl]propane, 2,2'-bis[4-(meth)acryloyloxypentaethoxyphenyl]propane, 2,2'-bis[4-(meth)acryloyloxydipropoxyphenyl]propane, 2,2'-bis[4-(meth)acryloyloxyethoxyethoxyphenyl]propane, 2-[4-(meth)acryloyloxydiethoxyphenyl]-2-[4-(meth)acryloyloxytriethoxyphenyl]propane, 2-[4-(meth)acryloyloxydipropoxyphenyl]-2-[4-(meth)acryloyloxytriethoxyphenyl]propane, or 2,2-bis[4-(meth)acryloyloxypropoxyphenyl]propane.

Preferably usable as the water-soluble organic solvent is acetone, methanol, ethanol, n-propanol, isopropyl alcohol, or methyl ethyl ketone.

As the chemical polymerization initiator, a suitable combination of an oxidizing agent, a reducing agent, and a polymerization promotor can be used preferably. As the oxidizing agent, there can be preferably used an organic peroxide such as benzoyl peroxide, parachlorobenzoyl peroxide, 2,4-dichlorobenzoyl peroxide, acetyl peroxide, lauroyl peroxide, tertiary butyl peroxide, cumene hydroperoxide, 2,5-dimethylhexane, 2,5-dihydroperoxide, methyl ethyl ketone peroxide, or tertiary butyl peroxybenzoate; or an azo compound such as azobisisobutyronitrile, methyl azobisisobutyrate, or azobiscyanovaleric acid. Preferably usable as the reducing agent is an amine compound such as N,N'-dimethyl-p-toluidine, N,N'-dimethylaniline, N'-β-hydroxyethyl-aniline, N,N'-di(β-hydroxyethyl)-aniline, N,N'-di(β-hydroxyethyl)-p-toluidine, N-methyl-aniline, or N-methyl-p-toluidine. Furthermore, a vanadium compound, a copper compound, a sulfinic acid salt, a borate compound, or a thiourea compound can be preferably used as the polymerization promotor. Any of these chemical polymerization initiator systems is so designed as to function as an initiator upon incorporation of all the components. Moreover, how the respective components for storage in the separate packages are combined is determined, as appropriate, in consideration of storage stability in accordance with the types of the liquid agents and the compounds to be concretely used. For example, the borate classified as the polymerization promotor as mentioned above functions as a reducing agent depending on the conditions, but in the absence of an acidic compound (if not under acidic conditions), can be stored together with the oxidizing agent.

The composite liquid agent package 100 includes a plurality of liquid agent housing portions 200, namely, a first liquid agent housing portion 200a filled with a first liquid agent (not shown) and holding it airtightly and liquidtightly, and a second liquid agent housing portion 200b filled with a second liquid agent (not shown) and holding it airtightly and liquidtightly, and a single binding portion 300. The liquid agents housed in the first liquid agent housing portion 200a and the second liquid agent housing portion 200b may be different from each other, but pouches housing the liquid agents are advantageously of substantially the same shape and size. If desired, as long as these pouches can be bound together as required and housed as required within an outer bag 3 to be described later, the pouch of the first liquid agent housing portion 200a and the pouch of the second liquid agent housing portion 200b can be rendered different from each other in shape and size. The binding portion 300 is sealants, constituent members of the housing portions 200a and 200b, fusion-bonded together. This portion 300 can be taken as divided into respective partial binding portions integrated with the housing portions 200a and 200b, namely, a first partial binding portion 310a (indicated by a dashed double-dotted line in FIG. 2) in the first liquid agent housing portion 200a, and a second partial binding portion 310b (indicated by a dashed double-dotted line in FIG. 5) in the second liquid agent housing portion 200b. Thus, the composite liquid agent package 100 can also be said to be a product such that a plurality of integrations of the liquid agent housing portions 200 and the partial binding portions 310 are bound together, with the sealants of the partial binding portions 310 being fusion-bonded together.

First, the liquid agent housing portion 200 will be described. The liquid agent housing portion 200 (the first liquid agent housing portion 200a and the second liquid agent housing portion 200b) holds a liquid agent (not shown) airtightly and liquidtightly within a pouch 210 formed from a heat-sealable laminated film 10 (may be called a heat-sealable laminated sheet if its thickness is large) of a laminated structure having at least an inner layer 11 and an outer layer 12 (see FIG. 4), the inner layer 11 being formed from a sealant. The pouch 210 has one end section 211 and an opposite end section 212 which are sealed sections formed by heat-sealing the end parts of the heat-sealable laminated film 10. When the composite liquid agent package 100 is housed within the outer bag 3 to be described later (see FIG. 6) to construct a kit, the first liquid agent and the second liquid agent are mixed together inside the outer bag 3, whereby the aforementioned dental adhesive can be prepared. For this purpose, the one end section 211 of the liquid agent housing portion is sealed so that it can be opened by applying a pressing force on the liquid agent filled in the liquid agent housing portion. The sealing strength of each heat-sealed section can be adjusted by setting, as appropriate, the dimension of the vertical width of the heat-sealed section. By enlarging the vertical width, the sealing strength can be increased. By decreasing the vertical width, conversely, the sealing strength can be weakened. In connection with the one end section 211, therefore, the vertical width of the heat-sealed section is set to be somewhat smaller than that of the other heat-sealed section so that the above-mentioned sealing strength will be achieved.

The inner layer 11 of the heat-sealable laminated film 10 (or heat-sealable laminated sheet) is composed of a highly heat-fusible (heat-sealable) resin serving as a sealant, for example, a mixture of polyethylene and a polymer alloy consisting essentially of an ionomer of an ethylene-methacrylate acrylate copolymer. The inner layer 11 (layer of the sealant) usually has a thickness of 10 to 100 µm, preferably 30 to 80 µm. The outer layer 12 comprises a resin having low heat fusibility (having no heat-sealability), an inorganic material, or a composite of them. Depending on the liquid agent to be housed inside, a material which imparts a function, such as oxygen gas shielding properties (oxygen gas impermeability) or ultraviolet light shielding properties, for a purpose such as enhancement of the storage stability of the liquid agent; a material for enhancing transparency which enables the presence of contents to be confirmed, or for enhancing printability on the outer surface; or the like is selected, as appropriate, for the outer layer. Moreover, an intermediate layer can be provided between the inner layer and the outer layer in order to impart higher functional characteristics.

In a typical embodiment, a liquid agent consisting essentially of acetone, a polymerizable monomer containing an acidic group-containing polymerizable monomer, and a polymerization promotor (vanadium) for a chemical polymerization initiator is used as the first liquid agent. As the laminated film constituting the first liquid agent housing portion 200a, use is made of a laminated film transparent as a whole, including, as the outer layer, a silica vapor-deposited transparent polyethylene terephthalate film; as the inner layer, a layer composed of a sealant comprising a mixture of polyethylene and a polymer alloy consisting essentially of an ionomer of an ethylene-methacrylate acrylate copolymer; and as the intermediate layer, a polyethylene layer or a nylon-derived gas barrier layer such as EVOH. As the second liquid agent, a liquid agent consisting essentially of acetone, isopropyl alcohol, water and a chemical polymerization initiator (borate compound and peroxide) is used. As the laminated film constituting the second liquid agent housing portion 200b, use is made of a laminated film opaque as a whole, including, as the outer layer, a polyethylene terephthalate film; as the inner layer, a layer composed of a sealant comprising a mixture of polypropylene and polyolefin consisting essentially of polypropylene; and as the intermediate layer, a dry laminate layer laminated using an adhesive, an aluminum vapor-deposited film layer, or an ethylene-methacrylate copolymer layer. The laminated film constituting the first liquid agent housing portion 200a tends to be selectively permeable to water molecules and, even if water mixes into the water-soluble organic solvent housed inside, enables the water to be selectively volatilized to the outside. Even if the water-soluble organic solvent contains water, or water is formed by a reaction during storage, therefore, the amount of water inside can be kept low, and hydrolysis of the acidic group-containing polymerizable monomer is suppressed so that the first liquid agent can be stored stably. The laminated film constituting the second liquid agent housing portion 200b, on the other hand, does not have the above selective permeability to water, and thus can maintain the initial water concentration when housing the aqueous organic solvent and water in combination. Consequently, the housing portion 200b can store the second liquid agent stably, without causing deterioration, such as a decline in tooth decalcifying properties due to a fall in the water concentration.

Figure 2:
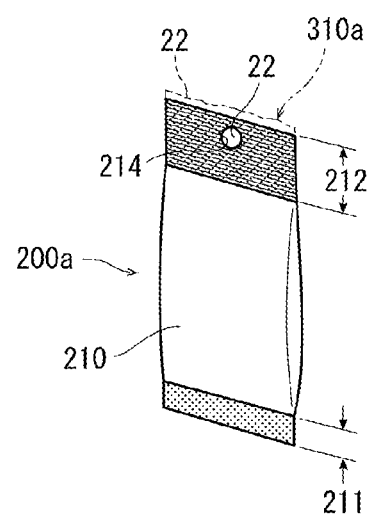
FIG. 2 is a perspective view, as viewed from front, showing one of two liquid agent housing portions for constituting the composite liquid agent package shown in FIG. 1, in a state before being integrated with the other liquid agent housing portion.
Figure 3:
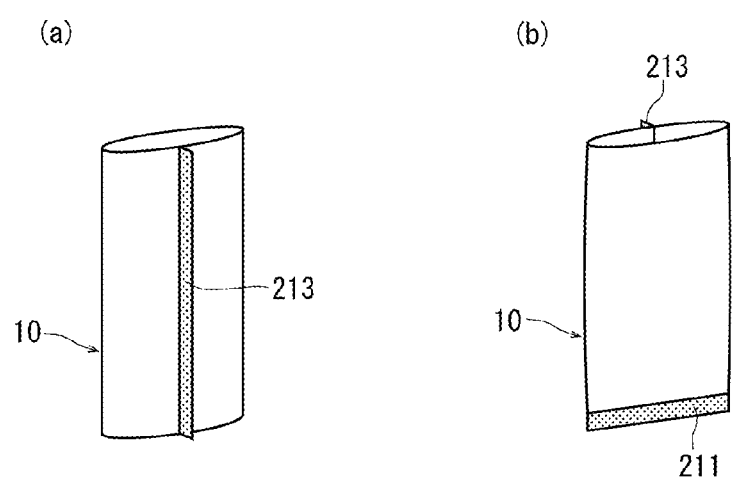
FIGS. 3(*a*), 3(*b*) are perspective views for illustrating a method for manufacturing a pouch constituting the liquid agent housing portion shown in FIG. 2.
Figure 5:
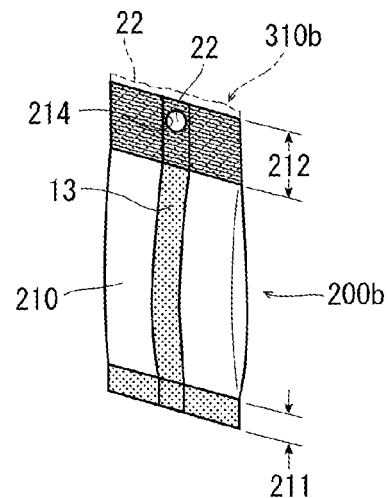
FIG. 5 is a perspective view, as viewed from behind, showing the other of the two liquid agent housing portions for constituting the composite liquid agent package shown in FIG. 1, in a state before being integrated with the one liquid agent housing portion.

The pouch 210 is not particularly limited as long as it has sealed sections as stated earlier, but preferably, it is a pillow flat bag as shown in FIGS. 2 and 5 because of the ease of manufacturing. The pillow flat bag herein may simply be called a flat bag, a bag sealed at the top, the bottom and the back. As illustrated in FIGS. 3(*a*), 3(*b*), both side edges of the rectangular laminated film 10 are heat-sealed (heat-fused) together to forma back sealed section 213, thereby constructing a tubular form (FIG. 3(*a*)). Furthermore, one end edge (lower end edge in FIGS. 2 and 3) and the other end edge (upper end edge in FIGS. 2 and 3) of the resulting tubular body are heat-sealed (heat-fused) to form the one end section 211 and the opposite end section 212. In this manner, the pouch 210 is produced. On this occasion, the filling of the liquid agent is performed before heat-sealing at the opposite end section 212 after heat-sealing at the one end section 211, as shown in FIG. 3(*b*).

The drawings show an example in which the pillow flat bag is produced using the single rectangular laminated film 10. Industrially, however, it is preferred to perform the production of the pouch and the filling of the liquid agent continuously by adopting a vertical pillow packaging method (a pouch making/filling method using a vertical pillow forming machine) which can carry out the above steps continuously while continuously supplying a strip-shaped laminated film wound in a roll shape. When the vertical pillow packaging method is adopted, the strip-shaped laminated film supplied continuously downwardly from above is sent to a guide of a hollow cylindrical or (inverted) truncated cone shape disposed vertically (with the central axis of the film in a vertical direction), and is thereby rounded in a width direction (a direction perpendicular to a flow direction; horizontal direction) to be formed into a tubular shape. Both side end sections (side edge regions) of the so rounded strip-shaped laminated film are heat-sealed (hereinafter, the heat seal along the flow direction may be called "longitudinal seal") to form the back sealed section 213 continuously, whereby a tubular body is completed. On the downstream side, the trunk of the tubular body is heat-sealed in a direction orthogonal to a length direction (or the back sealed section) (hereinafter, this heat seal may be called "lateral seal") to form a lateral sealed section. Then, a predetermined amount of the aforementioned liquid agent is poured from the inside of the hollow guide into the tubular body closed at a site below the lateral sealed section. Then, the tubular body is paid out by a predetermined fixed length, and then a lateral sealed section is formed again, whereby the liquid agent is enclosed inside. The lateral sealed section formed by the first lateral sealing is designated as the one end section 211, while the lateral sealed section formed by the second lateral sealing is designated as the opposite end section 212. On this occasion, the trunk may be cut between the opposite end section 212 and the one end section 211 formed by subsequent lateral sealing (the one end section of a next pillow flat bag) to cut off the pillow flat bag. Alternatively, the pillow flat bag maybe cut off in such a manner that heat sealing is performed, with the vertical width of each lateral sealed section being the sum of the vertical width of the one end section 211 and the vertical width of the opposite end section 212 and, after second lateral sealing, cutting is performed, with the downstream vertical width of the lateral sealed section serving as the vertical width of the one end section 211, and the upstream vertical width of the lateral sealed section serving as the vertical width of the one end section 211. In the embodiment shown in FIG. 2, a circular penetrating opening 214 having a predetermined diameter is provided in the opposite end section 212 of the pouch (pillow flat bag) 210 obtained after pouch production/filling for the purpose of making binding (joining) by mutual fusion bonding of the respective sealants in the binding portion more reliable and more firm.

Next, the binding portion 300 will be explained. At the extremity of each of the opposite end sections 212 of the respective liquid agent housing portions (e.g., 200*a* and 200*b*) constituting the plurality of liquid agent housing portions 200, a part of the sealant of the inner layer 11 of the heat-sealable laminated film 10 constituting each liquid agent housing portion (this partial sealant maybe called "extended-out sealant 22") is extended outwardly of the extremity of the outer layer 12 while keeping integral with the residual part of the sealant (this residual sealant may be called "outer layer backing residual sealant") to form an extended-out sealant (corresponding to the above-mentioned extended-out sealant 22), and the extended-out sealants are fusion-bonded together and integrated thereby to form a fused sealant 320, which constitutes the binding portion 300 or a main part thereof. The binding portion 300 having its whole or main part constituted by the fused sealant 320 is not a separately and independently formed member, but is formed by superposing all of the opposite end sections 212 of "liquid agent housing portion-intended individual packages", which are pouches individually manufactured and each holding the liquid agent airtightly and liquidtightly (for example, the aforementioned pillow flat bags each enclosing the liquid agent and produced by vertical pillow forming), and heating and pressuring superposed regions of all the opposite end sections overlapping. Thus, an explanation will be offered below for a method for manufacturing a composite liquid agent package in which the pouches 210 in the respective liquid agent housing portions 200 are all pillow flat bags.

<Method for Manufacturing Composite Liquid Agent Package>

A method for manufacturing the composite liquid agent package includes (I) a liquid agent housing portion-intended individual package provision step of providing a plurality of liquid agent housing portion-intended individual packages by vertical pillow packaging using a heat-sealable laminated film or heat-sealable laminated sheet including at least an inner layer composed of a sealant and an outer layer composed of a sheathing material, each of the liquid agent housing portion-intended individual packages being adapted to hold airtightly and liquidtightly a liquid agent inside a pouch comprising a pillow flat bag having a lower end side heat-sealed section as one end section, an upper end side heat-sealed section as an opposite end section and, further on a back surface thereof, a back sealed section formed by heat sealing, and (II) a joining step of superposing all of the opposite end sections of the plurality of liquid agent housing portion-intended individual packages provided in the liquid agent housing portion-intended individual package provision step, and heating and pressurizing superposed regions of all the opposite end sections overlapping, to extrude a part of the sealant, which constitutes the inner layer in the superposed region of each of the opposite end sections, outwardly from the extremity of the outer layer of each of the opposite end sections, thereby fusion-bonding together the extruded extended-out sealants 22 during extrusion.

Figure 4:
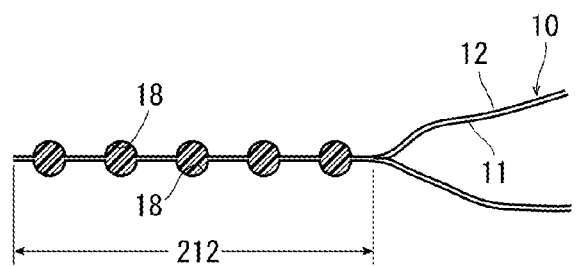
FIG. 4 is a sectional view for illustrating the method for manufacturing the pouch shown in FIG. 2.

The liquid agent housing portion-intended individual package provided in the liquid agent housing portion-intended individual package provision step (I) corresponds to the pillow flat bag 210 enclosing the liquid agent which has been obtained by performing bag production and liquid filling and enclosing by the above-mentioned vertical pillow packaging method. The formation of the one end section 211, the opposite end section 212, and the back sealed section 213 by heat sealing, and the filling (pouring) and enclosing of the liquid agent are also performed in the same manner. In order to extrude the sealant reliably in the subsequent joining step (II), thereby securing the extended-out sealants in a sufficient amount to bind together the liquid agent housing portion-intended individual packages, it is preferred that in the liquid agent housing portion-intended individual package provision step, protrusions and depressions be provided in the upper end side heat-sealed section serving as the opposite end section, and that the thickness of the sealant in the protrusion backing part be larger than the thickness of the inner layer of the heat-sealable laminated film or heat-sealable laminated sheet, as shown in FIG. 4. Such protrusions and depressions can be formed, for example, by performing heat sealing with the use of a heat sealer having a seal bar formed with protrusions and depressions on the surface. When the formation of the opposite end section (sealed section) having such protrusions and depressions is carried out using the heat-sealable laminated film 10 (or heat-sealable laminated sheet) with the 50 μm thick inner layer 11 (sealant 20), for example, the thickness of the sealant in the protrusion can be rendered 80 to 120 μm, and the thickness of the sealant in the depression can be rendered 10 to 50 μm.

In the joining step (II), all of the opposite end sections of the plurality of liquid agent housing portion-intended individual packages provided in the liquid agent housing portion-intended individual package provision step are superposed, and the superposed regions of all the opposite end sections overlapping are heated and pressurized. In the opposite end section 212 at this time, a part of the sealant, which constitutes the inner layer 11 of the heat-sealable laminated film 10, extends outwardly of the extremity of the outer layer 12 while keeping integral with the residual sealant (outer layer backing residual sealant) to form the extended-out sealant 22, and the resulting extended-out sealants 22 are fusion-bonded together and integrated to form the fused sealant 320. As a result, the plurality of liquid agent housing portion-intended individual packages are bound (joined) together at the site extended out from the extremity of the outer layer 12. If, in this case, the above protrusions and depressions are formed in the opposite end section 212, the heating and pressurization of the superposed region during the joining step (II) result in a strong pressure being exerted on a large amount of the (heat-softened) sealant in the protrusion. Thus, the amount of the sealant (extended-out sealant 22) extruded outwardly from the extremity of the outer layer 12 can be increased. Furthermore, it is preferred that before the joining step (II), the circular penetrating opening 214 having a predetermined diameter be provided at nearly the center of the opposite end section 212 of the pillow flat bag 210. The penetrating opening 214 is preferably provided at the same position of all the opposite end sections 212 so that such penetrating openings will be formed even in the superposed regions of all the opposite end sections 212 overlapping. If such a penetrating opening 214 is provided, the sealant is extruded from the peripheral edge terminal of the penetrating opening 214 toward the inside of the penetrating opening 214, serving as a part of the extended-out sealant 22 when the superposed regions are heated and pressurized. This sealant forms the fused sealant 320 within the penetrating opening, constituting a part of the binding portion 30. Hence, more reliable and firm binding (joining) can take place.

As described above, the first liquid agent housing portion 200*a* and the second liquid agent housing portion 200*b* are superposed on each other, and fusion-bonded together at the binding portion 300 and thereby joined together fully firmly, whereby the integrated composite liquid agent package 100 is manufactured, as shown in FIG. 1.

By using the above composite liquid agent package, the constituent components of a multicomponent liquid composition, which exhibits a predetermined function, can be stored integrally in separate packages containing two or more liquid agents. Thus, the composite liquid agent package is suitable for storing a multicomponent liquid composition, like a dental adhesive composition, which cannot be stored stably as a single liquid agent containing all of constituent components, for a long period of time in a stable manner. Even in the case of storage using the composite liquid agent package, however, the plurality of liquid agents stored as separate packages within the pouches need to be taken out of the pouches and mixed to prepare the multicomponent liquid composition at the time of use. With the composite liquid agent package of the present invention, the one end sections of the respective liquid agent housing portions are sealed so that it can be opened by applying a pressing force on the liquid agents filled inside. By squeezing the pouch with fingers, for example, to apply a pressing force to the liquid agent, therefore, the total amount or nearly the total amount of each liquid agent contained inside can be easily flowed out of the pouch. For this purpose, the amounts of the respective liquid agents stored in the separate packages are adjusted beforehand to such amounts as to obtain the targeted formulation of the multicomponent liquid composition after the mixing operation. By so doing, the targeted multicomponent liquid composition can be prepared easily. If the total amount or nearly the total amount of all the liquid agents stored in the separate packages fail to be easily flowed out, on the other hand, some of the liquid agents do not flow out at all, or a non-negligible amount of the liquid agent remains inside the pouch. Consequently, there is a risk that the desired formulation cannot be obtained after mixing, and the original function cannot be exhibited any more. The composite liquid agent package of the present invention, therefore, is excellent in that such a risk is absent or extremely low.

If the composite liquid agent package is used alone and stored, however, a container for mixing needs to be provided separately before flowing the liquid agents out of the pouches and mixing them. In this case, there is a risk that the liquid agent will spill, or will be contaminated with foreign matter such as dirt, when filled into the container. To avoid such a risk, it is preferred to construct the kit of the present invention with the use of an outer bag. A multicomponent liquid composition preparing kit according to the present invention (may hereinafter be referred to as "kit of the present invention") will be described below.

<Multicomponent Liquid Composition Preparing Kit>

The kit of the present invention is a multicomponent liquid composition preparing kit for storing the constituent components of a multicomponent liquid composition, which exhibits a predetermined function, in separate packages containing two or more liquid agents, and for mixing, when in use, the respective liquid agents divided into the separate packages to prepare the multicomponent liquid composition, and is characterized by fulfilling the following conditions (1) and (2):

(1) The kit includes the composite liquid agent package of the present invention for storing the constituent components of a multicomponent liquid composition, which exhibits a predetermined function, integrally in separate packages containing two or more liquid agents; and an outer bag for fixing the composite liquid agent package inside and housing it liquidtightly.

(2) The outer bag has a liquid reservoir space capable of holding all the liquid agents, which flow out when the liquid agents held in the liquid agent housing portions of the composite liquid agent package fixed and housed inside are flowed out from the one end sections of the liquid agent housing portions by application of a pressing force to the liquid agents, without bringing the liquid agents into contact with the composite liquid agent package.

Figure 6:
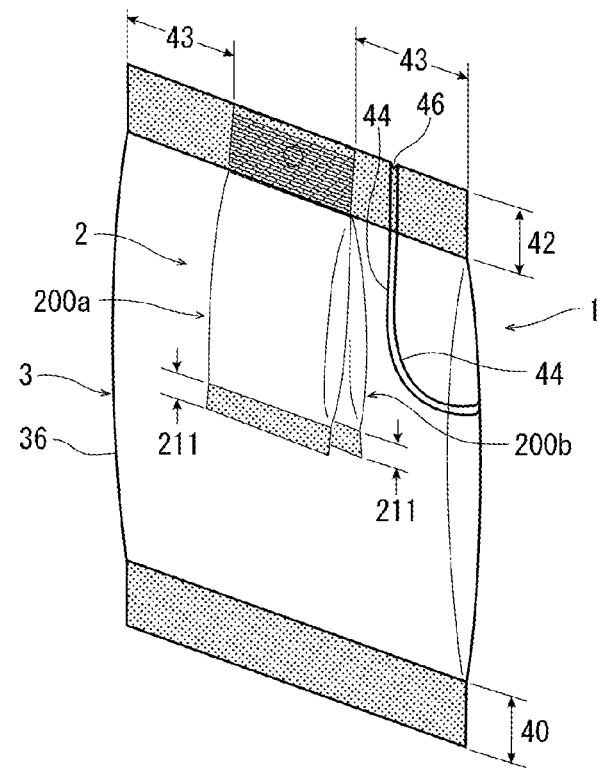
FIG. 6 is a perspective view showing a preferred embodiment of a kit for preparing a multicomponent liquid composition (or a multicomponent liquid composition preparing kit), the kit being constituted according to the present invention.
Figure 7:
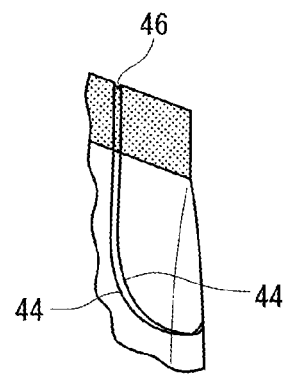
FIG. 7 is a partial perspective view showing a modification of a pair of weakened lines in the multicomponent liquid composition preparing kit shown in FIG. 6.
Figure 9:
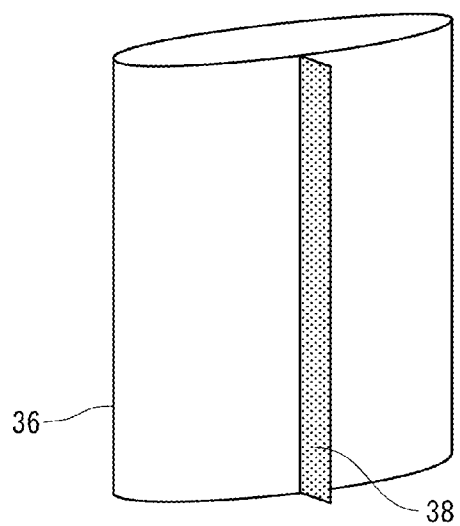
FIG. 9 is a perspective view for illustrating a method for manufacturing the multicomponent liquid composition preparing kit shown in FIG. 6.

Further referring to FIGS. 6 and 7, the multicomponent liquid composition preparing kit, constructed in accordance with the present invention and entirely indicated at a numeral 1, has a composite liquid agent package 2 and an outer bag 3, and the composite liquid agent package 2 is fixed inside the outer bag 3. The aforementioned composite liquid agent package 100 is preferably used as the composite liquid agent package 2. In the drawings, the same one as the composite liquid agent package 100 is shown, and its one end section, opposite end section, binding portion, penetrating opening, etc. are assigned the same numerals as those of the composite liquid agent package 100. The outer bag 3 is a pouch which can be formed from a suitable synthetic resin film or sheet, and both side edges and one end edge thereof are closed throughout. As disclosed in Patent Document 1 cited earlier, the opposite end edge of the outer bag 3 can be closed at one part only, and may be open at the remaining part. From the viewpoints of preventing splatters during the outflow of the liquid agent, and preventing contamination due to the intrusion of dirt or the like, however, it is advantageous that the opposite end edge be also closed all over. In the illustrated preferred embodiment, the outer bag 3 is also a pillow flat bag constituted by a heat-sealable laminated film (or heat-sealable laminated sheet) 36 including at least an inner layer comprising a sealant and an outer layer comprising a sheathing material. As shown in FIG. 9, both side edges of the rectangular heat-sealable laminated film (or heat-sealable laminated sheet) 36 are heat-fused (heat-sealed) together to form a back sealed section 38, thereby constructing a tubular form. Furthermore, one end edge (lower end edge in FIGS. 6 and 9) and the other end edge (upper end edge in FIGS. 6 and 7) of the resulting tubular body are heat-fused (heat-sealed) to form a lower end sealed section (one end section) 40 and an upper end sealed section (opposite end section) 42. In this manner, a pouch as the outer bag is produced.

The pillow flat bag constituting the outer bag 3 needs to have a liquid reservoir space capable of holding all the liquid agents, which flow out when the liquid agents held in the liquid agent housing portions 200 of the composite liquid agent package 100 are flowed out from the one end sections 211 of the liquid agent housing portions by application of a pressing force to the liquid agents, without bringing the liquid agents into contact with the composite liquid agent package 100. To secure such a liquid reservoir space, the length of the pillow flat bag constituting the outer bag 3 is set to be greater by a predetermined length than the length of the composite liquid agent package 100. To form an applicator insertion opening as will be described later, moreover, it is preferred that the width of the pillow flat bag (the lateral length of the upper end sealed section or the lower end sealed section) be set to be larger by a predetermined length than the width of the pillow flat bag 210 in the liquid agent housing portion 200 (the length of the one end section or the opposite end section) so that an adequate space for this purpose will be secured.

When the opposite end edge of the multicomponent liquid composition preparing kit is closed throughout, the outer bag 3 is in a tightly closed state with its four sides being sealed. In this case, the space between the outer bag 3 and the composite liquid agent package 100 may be in a vacuum state, but usually air (atmosphere) is enclosed inside the space. At this time, in order to facilitate the outflow of the liquid agent held in each liquid agent housing portion 200 of the composite liquid agent package 100 from the one end section of each liquid agent housing portion by exerting a pressing force on the liquid agent, it is preferred to adjust the amount of air enclosed in the space between the outer bag 3 and the composite liquid agent package 100 so that the volume of this space becomes 1 to 70%, particularly 5 to 40%, of the maximum volume of the space (a volume obtained by subtracting a volume occupied by the composite liquid agent package 100 housed inside, from a volume when the outer bag 3 is filled with air as much as possible at atmospheric pressure or under such slightly pressurized conditions as not to damage the outer bag 3). The reasons are as follows: If the amount of air within the outer bag 3 is too large, it becomes difficult to exert the pressing force on the liquid agent held in each liquid agent housing portion 200 of the composite liquid agent package 100, thus decreasing the ease of withdrawal of the liquid. If the amount of air within the outer bag 3 is extremely small, by contrast, it may be impossible to adequately secure the liquid reservoir space for preventing the outflowing liquid agent from contacting the composite liquid agent package 100.

The heat-sealable laminated film (or sheet) 36 basically has the same structure as the structure of the heat-sealable laminated film 10 constituting the composite liquid agent package 100, and can use the same heat-sealing material as the heat-sealing material in the heat-sealable laminated film 10. However, it is preferred for the outer bag 3 to have transparency as a whole, in order that the position of the composite liquid agent package 100 placed inside will be confirmed to make the site of the liquid agent easy to press, and further the position of the liquid agent flowed out by pressing will become easy to confirm. For this purpose, a material having transparency is preferably used as a sheathing material constituting the outer layer of the outer bag 3. Preferred as such a sheathing material is, for example, a film or sheet of an olefin polymer such as polyethylene, polypropylene, polybutylene, or a copolymer formed by copolymerizing at least two olefin monomers selected from ethylene, propylene and butene; a (meth)acrylic polymer such as poly(meth) acrylic acid, or a copolymer formed by copolymerizing two or more (meth)acrylate monomers, typified by polymethyl methacrylate; a styrene polymer such as polystyrene, poly(acrylonitrile-styrene), poly(butadiene-styrene), or ABS polymer; a flexible vinyl polymer such as polyvinyl acetate, polyvinyl chloride, polyvinylidene chloride, chlorinated polyvinyl chloride, or a copolymer formed by copolymerizing two or more vinyl chloride monomers or vinyl acetate monomers; an amide polymer such as nylon 6, nylon 66, nylon 610, nylon 612, nylon 11, nylon 12 or nylon 46; an unsaturated polyester resin such as polyethylene terephthalate; a thermoplastic elastomer produced by ester exchange or a polycondensation reaction using dimethyl terephthalate, 1,4-butanediol, or poly(oxytetramethylene) glycol as a starting material; a fluoropolymer such as polytetrafluoroethylene, polytrifluoroethylene, polyvinylidene fluoride, or a copolymer obtained by copolymerizing at least two fluorine monomers selected from tetrafluoroethylene, trifluoroethylene, and vinyl fluoride; or other polymer such as polycarbonate, polyacetal, polyethersulfone, polyphenylene oxide, polyphenylene sulfide, or polysulfone. In particular, the film or sheet of an olefin polymer such as polyethylene, polypropylene, polybutylene, or a copolymer formed by copolymerizing at least two olefin monomers selected from ethylene, propylene and butene is particularly preferred in terms of safety for a living body, and transparency and flexibility of the starting material.

By constructing the outer bag 3 from the above-mentioned heat-sealable laminated film 36, it becomes possible to fix the composite liquid agent package 100 to the interior of the outer bag 3 by utilizing fusion bonding between the sealant constituting the inner layer of the outer bag 3 and the fused sealant 320 of the binding portion 300 in the composite liquid agent package 100. The site of fusion bonding/fixing, the position where the composite liquid agent package 100 is fixed by such fusion bonding (the position on the inner layer of the outer bag 3), can be set optionally. For the reasons that the liquid reservoir space is easy to secure and that the number of the heat-sealing operations during manufacturing can be reduced, however, it is preferred to determine the site of fusion bonding/fixing so that as a result of the fixing by fusion bonding, at least one side end of the pouch 210 of the composite liquid agent package 100 will be parallel, with a predetermined spacing, to the side end, on the same side, of the outer bag 3 in the upper end sealed section 42 of the outer bag 3. By so determining the site of fusion bonding/fixing, a simple sealed section 43, where the sealants constituting the inner layer of the outer bag 3 are fusion-bonded together, is formed in a region beside at least one side end of the upper end sealed section 42 of the outer bag 3. By notching the simple sealed section 43, an applicator insertion opening can be formed, even with the composite liquid agent package 100 being left behind within the outer bag 3.

To form the applicator insertion opening, it suffices to notch an upper part including at least a part of the upper end sealed section 42 of the outer bag 3. For example, when notching the whole of, or the upper part including a part of, the upper end sealed section 42, it is permissible to concomitantly remove the composite liquid agent package 100 joined to the upper end sealed section 42. By so doing, an operation involving the insertion of the applicator can be performed easily.

Figure 13:
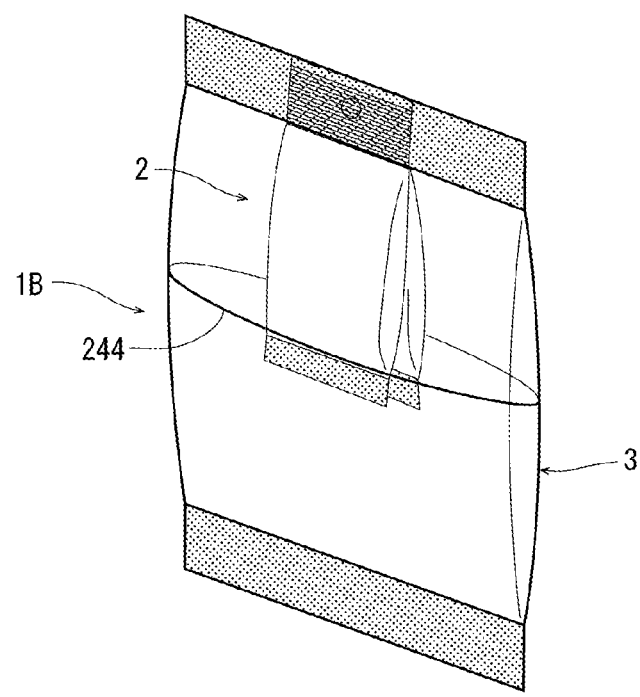
FIG. 13 is a perspective view showing still another preferred embodiment of the multicomponent liquid composition preparing kit constituted according to the present invention.
Figure 14:
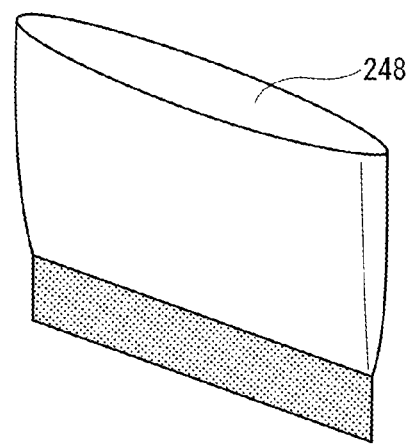
FIG. 14 is a perspective view for illustrating the manner of using the multicomponent liquid composition preparing kit shown in FIG. 13.
Figure 15:
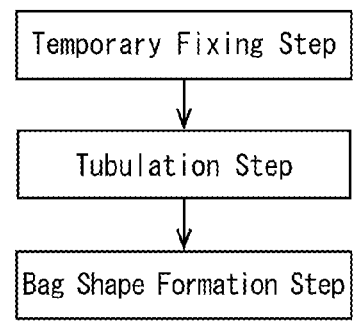
FIG. 15 is a schematic view showing a manufacturing process for the multicomponent liquid composition preparing kit shown in FIG. 6.

To facilitate the above notching, the following procedure is preferred: In the front wall and the back wall of the outer bag 3 facing each other, there is formed (1) a weakened line 44 starting at a point, predetermined beside the site of fusion bonding/fixing, of the upper end edge of the one-side simple sealed section 43 in the upper end sealed section 42, and ending at a point predetermined close to the upper part of the side end edge on the side of the one-side simple sealed section 43 in the outer bag 3 (FIG. 6); (2) a weakened line 144 starting at a point, predetermined beside the site of fusion bonding/fixing, of the upper end edge of the one-side simple sealed section 43 in the upper end sealed section 42, and ending at a point predetermined close to the upper part of the side end edge on the opposite side of the one-side simple sealed section 43 in the outer bag 3 (FIG. 11); or (3) a weakened line 244 starting at a point, predetermined close to the upper part of the side end edge on one side, and ending at a point predetermined close to the upper part of the side end edge on the opposite side (FIG. 13). Then, the weakened line 44, 144, or 244 is broken to remove a partial piece above the weakened line 44, 144 or 244 in the outer bag 3, whereby the applicator insertion opening can be formed.

Figure 10:
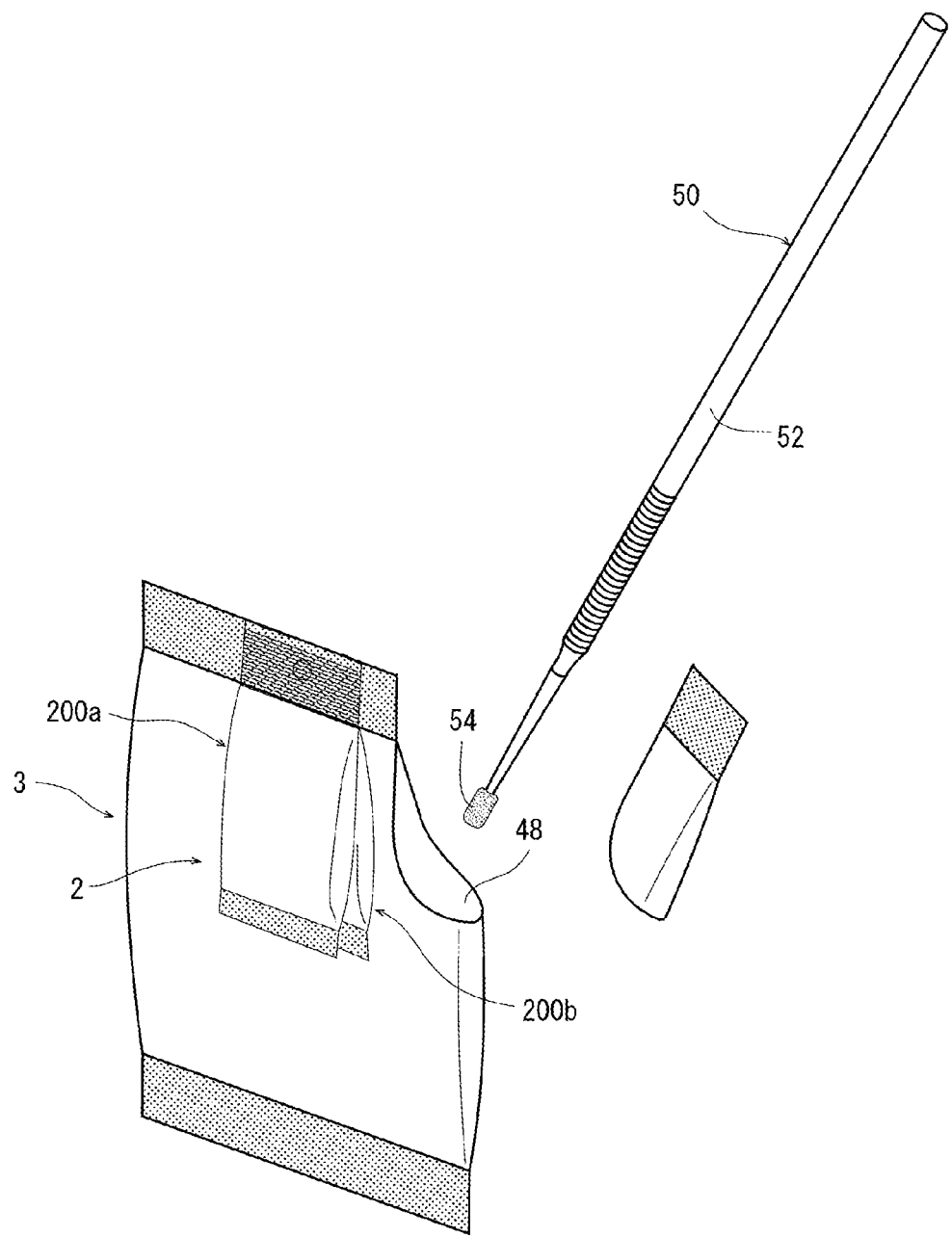
FIG. 10 is a perspective view for illustrating the manner of using the multicomponent liquid composition preparing kit shown in FIG. 6.
Figure 11:
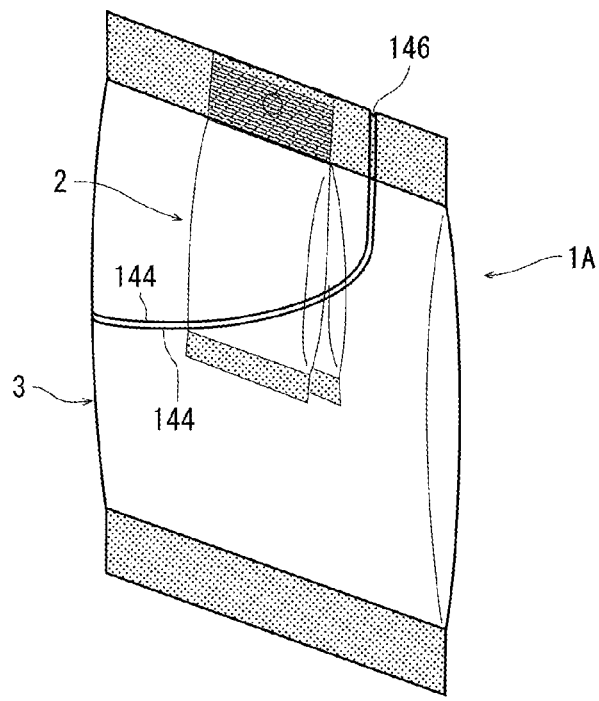
FIG. 11 is a perspective view showing another preferred embodiment of the multicomponent liquid composition preparing kit constituted according to the present invention.
Figure 12:
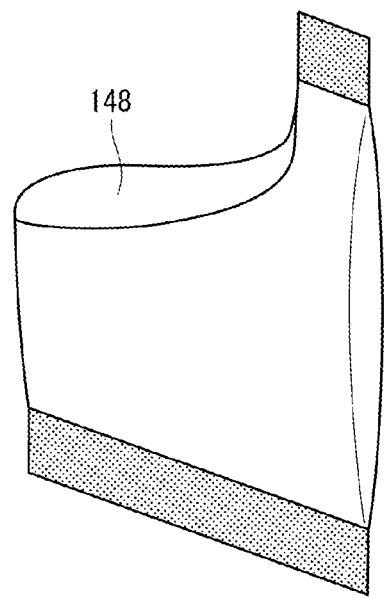
FIG. 12 is a perspective view for illustrating the manner of using the multicomponent liquid composition preparing kit shown in FIG. 11.

FIGS. 6 and 10 show the embodiment indicated in the (1) above. By breaking the weakened line 44 to remove the part above the weakened line 44 in the outer bag 3, the applicator insertion opening can be formed, with the composite liquid agent package 2 being left behind within the outer bag 3. FIG. 11 shows the embodiment indicated in the (2) above. As shown in FIG. 12, when the part above the weakened line 144 in the outer bag 3 is removed, the composite liquid agent package 2 is also removed concomitantly. As a result, no obstacle is present in the region including the liquid reservoir space remaining in the outer bag 3, thus making the operability of the inserted applicator high. FIG. 13 shows the embodiment indicated in the (3) above. Like the embodiment shown in FIG. 11, when the part above the weakened line 244 in the outer bag 3 is removed, the composite liquid agent package 2 is also removed concomitantly. As a result, no obstacle is present in the region including the liquid reservoir space remaining in the outer bag 3, thus making the operability of the inserted applicator high.

In the embodiment shown in FIG. 6, a notch 46 is provided at the starting point provided on the left end side (beside the site of fusion bonding/fixing) in the upper end edge of the right-hand simple sealed section 43 in FIG. 6, and the front wall and the back wall of the outer bag 3 facing each other are formed with a pair of (two of) the weakened lines 44 extending from both sides of the notch 46. If desired, the notch 46 may be omitted, but the presence of the notch 46 makes it easy to start the breakage of the outer bag 3 along the weakened line 44. The paired weakened lines 44 extend linearly downwardly from the notch 46 in parallel with each other at an equal distance of the order of about 0.5 to 3.0 mm, and then extend arcuately to the one side edge (right side edge in FIG. 6) of the outer bag 3. Advantageously, the segment of the weakened line 44 extending linearly downwardly is situated adjacent to the one side edge of the composite liquid agent package 2 housed within the outer bag 3 and, when the applicator insertion opening is formed upon breakage of the weakened lines 44, the applicator insertion opening is sufficiently provided in a front-to-back direction owing to the presence of the composite liquid agent package 2. The weakened line 44 can be advantageously formed by irradiating a required site of the laminated film or sheet 36 with a laser beam to reduce the thickness locally.

By providing the weakened lines in a pair as above, a break in the outer bag 3 started at the notch 46 is allowed to proceed along anyone of the paired weakened lines 44 without deviating from the broken line 44 (without going out from between the two weakened lines 44).

Figure 8:
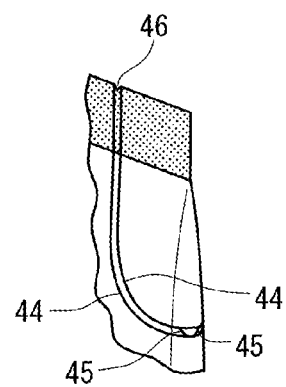
FIG. 8 is a partial perspective view showing another modification of the pair of weakened lines in the multicomponent liquid composition preparing kit shown in FIG. 6.

In the embodiment shown in FIG. 6, usually, the break (crack) started at the notch 46 merges with one of the paired weakened lines and spreads and, at the one side edge (right side edge in FIG. 6) of the outer bag 3, which is the ending point of the weakened line, the outer bag 3 is cut into two parts. At this time, it rarely occurs that the break (crack) started at the notch 46 merges with the weakened line, which is different between the front surface and the back surface of the outer bag 3, and spreads and proceeds along the different line. Eventually, the cut-off point may slightly differ between the front surface and the back surface, making smooth separation of the cut-off part impossible. For the reason that the occurrence of such a phenomenon can be prevented, it is preferred that the paired weakened lines 44 be gradually brought close to each other in the arcuately extending portion, and caused to merge at or ahead of the ending point, as shown in FIG. 7; or that auxiliary weakened lines 45 connecting the parallel paired weakened lines 44 be provided in the arcuately extending portion ahead of the ending point, as shown in FIG. 8.

The weakened line 44 need not necessarily be provided and, if provided, the single weakened line, rather than the paired (two) weakened lines, may be provided. From the viewpoint of preventing an unexpected break, it is preferred to form the weakened line 44, and it is further preferred to provide the pair of weakened lines 44, as in the above-described embodiments. If desired, a suitable print (not shown) matched to a purpose, such as an indication or the like for showing the presence of the weakened line 44, can be applied to the front wall and/or the back wall of the outer bag 3.

<Method for Using Multicomponent Liquid Agent Composition Preparing Kit>

The multicomponent liquid agent composition preparing kit 1 is used in the following manner: First, the front wall and the back wall of the outer bag 3 are held between the two fingers to press the outer bag 3, and a pressing force is exerted simultaneously on the first liquid agent and the second liquid agent filled, respectively, in the first liquid agent housing portion 200a and the second liquid agent housing portion 200b of the composite liquid agent package 2. By so doing, the one end sections (lower end sections) 211 of the liquid agent housing portions 200a and 200b are unsealed. Thus, the two liquid agents are flowed out downward, and accumulated in the liquid reservoir space defined 50 in the lower part of the outer bag 3. In this space, both liquid agents are mixed together, whereby a dental adhesive composition, the targeted liquid composition, is prepared. At this time, the outer bag 3 is closed throughout, so that there are no splatters of the first liquid agent and/or the second liquid agent out of the outer bag 3. Then, the outer bag 3 is broken along any one of the paired weakened lines 44, starting at the notch 46, to remove a part above the weakened lines 44. As a result, an applicator insertion opening 48 extending from the upper end edge to the one side edge is formed in the outer bag 3, as shown in FIG. 10. Then, the outer bag 3 is gripped with one of the hands, while an applicator 50 is gripped with the other hand, and the applicator 50 is inserted into the outer bag 3 through the applicator insertion opening 48. The applicator 50 of a well-known shape per se has an elongated rod-shaped body 52, and a liquid holding portion 54 disposed at the leading end thereof. The liquid holding portion 54 is formed from many hairy pieces. The liquid holding portion 54 of the applicator 50 is dipped in the dental adhesive composition present within the outer bag 3 to hold the dental adhesive composition in the liquid holding portion 54 of the applicator 50. Then, the applicator 50 is withdrawn from the outer bag 3, and the dental adhesive composition is applied to a required site of a patient's tooth to be treated.

FIG. 11 shows another preferred embodiment of the multicomponent liquid composition preparing kit constituted according to the present invention. In a multicomponent liquid composition preparing kit 1A shown in FIG. 11, a notch 146 is provided at a starting point provided on the left end side (beside the site of fusion bonding/fixing) at the upper end edge of a right-hand simple sealed section 143 in FIG. 11, and the front wall and the back wall of the outer bag 3 facing each other are formed with a pair of (two) weakened lines 144 extending from both sides of the notch 146. The paired weakened lines 144 extend downward from the notch 146, and then extend nearly arcuately to an ending point predetermined close to an upper part of the side end edge on the opposite side of the outer bag 3. The other configuration of the multicomponent liquid composition preparing kit 1A is substantially the same as the multicomponent liquid composition preparing kit 1. In the so configured multicomponent liquid composition preparing kit 1A, the first liquid agent and the second liquid agent are flowed out into the liquid reservoir space within the outer bag 3, and mixed together there. Then, the weakened lines 144 are broken, and the composite liquid agent package 2 housed in the outer bag 3 is separated and removed together with the part above the weakened lines 144 in the outer bag 3 to form an applicator insertion opening 148 extending from the one side edge to the other side edge (FIG. 12). Then, a lower remaining part of the outer bag 3 housing in the liquid reservoir space the dental adhesive composition prepared by the above-mentioned mixing is held with one of the hands, while the applicator 50 (FIG. 10) is gripped with the other hand, and the mixture is applied to a required site of the patient's tooth to be treated. If necessary, instead of holding the lower remaining part of the outer bag 3 with the one hand, it is possible to hold it with the use of a suitable holder having a holding mechanism which accepts and supports the lower remaining part. If desired, as described above by reference to FIGS. 7 and 8, the paired weakened lines 114 can be gradually brought close to each other in the arcuately extending portion, and caused to merge at or ahead of the ending point, or auxiliary weakened lines connecting the parallel paired weakened lines 144 can be provided in the arcuately extending portion ahead of the ending point.

FIG. 13 shows still another preferred embodiment of the multicomponent liquid composition preparing kit constituted according to the present invention. In a multicomponent liquid composition preparing kit 1B shown in FIG. 13, a weakened line 244 extending widthwise from one side edge to an opposite side edge of a trunk of the outer bag 3 located above the liquid reservoir space is formed in the front wall and back wall of the outer bag 3. The other configuration of the multicomponent liquid composition preparing kit 1B is substantially the same as the multicomponent liquid composition preparing kit 1. The manner of using the so configured multicomponent liquid composition preparing kit 1B will be described. As with the multicomponent liquid composition preparing kit 1, the first liquid agent and the second liquid agent are flowed out into the liquid reservoir space within the outer bag 3, and mixed together there. Then, the weakened line 244 is broken, and the composite liquid agent package 2 housed in the outer bag 3 is separated and removed together with the part above the weakened line 244 in the outer bag 3 to form an applicator insertion opening 248 extending from the one side edge to the other side edge. Then, as with the multicomponent liquid composition preparing kit 1A shown in FIG. 11, a lower remaining part of the outer bag 3 housing in the liquid reservoir space the dental adhesive composition prepared by the above-mentioned mixing is held with one of the hands, while the applicator 50 (FIG. 10) is gripped with the other hand, and the mixture is applied to a required site of the patient's tooth to be treated. If necessary, instead of holding the lower remaining part of the outer bag 3 with the one hand, it is possible to hold it with the use of a suitable holder having a holding mechanism which accepts and supports the lower remaining part.

<Method for Manufacturing Multicomponent Liquid Composition Preparing Kit>

As has already been explained using FIG. 9, the outer bag of the multicomponent liquid composition preparing kit according to the present invention is formed, for example, in the following manner: Both side edges of a rectangular heat-sealable laminated film are heat-sealed together to form a back sealed section, thereby constructing a tubular form. Furthermore, the lower end edge and upper end edge of the resulting tubular body are heat-sealed to form a lower end sealed section and an upper end sealed section, respectively, thereby forming a pouch as the outer bag. Alternatively, the rectangular heat-sealable laminated film before the above tubular body formation is arranged to have its inner layer as an upper surface and, on this upper surface, the composite liquid agent package 2 (i.e., the composite liquid agent package 100 shown in FIG. 1) is placed so that its opposite end section 212 becomes orthogonal to the length direction of the rectangular film (the package 100 parallels the length direction), and the package is temporarily fixed. Then, the rectangular film is formed into a pouch as the outer bag by the above procedure, whereby the kit can be manufactured easily. In the case of manufacture by such a method, the proper fixing of the composite liquid agent package 2 may be performed as a separate step after bag manufacturing, and can be carried out instead of the temporary fixing. However, the liquid reservoir space should be easily secured and, when the applicator insertion opening is to be formed, the presence of the composite liquid agent package 2 should desirably be rendered useful for increasing the width of the opening, or the composite liquid agent package 2 should be removable together with the part above the weakened line 144 or 244. From these viewpoints, it is preferred to place the composite liquid agent package 2 within the region serving as the upper end sealed section 42, and fix it there temporarily, and further perform the proper fixing of the composite liquid agent package 2 concurrently with the sealing of the upper edge. These points have already been described as an explanation for the preferred position of the site of fusion bonding/fixing.

An explanation has been offered above for the example of manufacturing the multicomponent liquid composition preparing kit of the present invention individually using the rectangular heat-sealable laminated film. Industrially, however, it is preferred to perform the fixing of the composite liquid agent package and the manufacture of the bag, by adopting a lateral pillow packaging method (method of fixing and bag manufacturing using a lateral pillow forming machine) capable of continuously performing the above process while continuously supplying a strip-shaped laminated film (base material) wound in a roll. This method feeds out a strip-shaped laminated film, with its inner layer facing upward, toward a guide disposed downstream, rounds it in a width direction (a direction perpendicular to the flow direction: horizontal direction) in the guide to form a tubular body, performs back sealing of the tubular body, and further performs lateral sealing on the downstream side, to manufacture a bag. Besides, the method temporarily fixes the composite liquid agent package before forming the tubular body, instead of filling the liquid agent. Except for these steps, the method is basically the same as the method for manufacturing the pouch 210, the pillow flat bag in the composite liquid agent package, by the vertical pillow packaging method.

The preferred manufacturing method for manufacturing the multicomponent liquid composition preparing kit 1 (1A, 1B) by the above-described method will be described in detail below.

The method includes (i) a temporary fixing step of placing a strip-shaped base material, which comprises a heat-sealable laminated film or heat-sealable laminated sheet including at least an inner layer composed of a sealant and an outer layer composed of a sheathing material, in such a manner that the inner layer becomes an upper surface, placing a plurality of the composite liquid agent packages 2 flatly on the upper surface, at predetermined space intervals, at the widthwise center or at nearly the widthwise center of the strip-shaped base material such that the opposite end sections of the packages 2 are orthogonal to the length direction of the strip-shaped base material, and temporarily fixing the packages 2;

(ii) a tubulation step of heat-sealing (longitudinally sealing) both side end section regions of the strip-shaped base material, which has the plurality of composite liquid agent packages 2 temporarily fixed thereto at the predetermined space intervals and which has been obtained by the temporary fixing step (i), in such a manner as to be parallel to the length direction, thereby joining them together to obtain a tubular body having the composite liquid agent packages 2 arranged and temporarily fixed inside at the predetermined space intervals; and (iii) a bag shape formation step of heat-sealing (laterally sealing) a trunk between the composite liquid agent packages 2, which have been temporarily fixed adjacent to each other in the tubular body obtained in the tubulation step (ii), in such a manner as to be orthogonal to the length direction, thereby joining the trunk, and cutting the center or nearly the center of the joined trunk to obtain a pillow flat bag housing the single composite liquid agent package 2, the method further comprising
fusion bonding the integrated fused sealant of the binding portion of the temporarily fixed composite liquid agent package 100, and the sealant of the inner layer of the strip-shaped base material to each other, during heat sealing (lateral sealing) in the bag shape formation step (iii).

If the weakened line 44 (144, 244) is to be formed here, it is recommendable to perform a weakened line formation step of irradiating a predetermined position of the strip-shaped base material with a laser beam, thereby reducing the thickness of the strip-shaped base material to form a weakened line, prior to the bag shape formation step (iii), preferably even prior to the tubulation step (ii).

The position of temporary fixing in the temporary fixing step (i) is a position serving as the site of fusion bonding/fixing. This position is preferably within a region serving as the upper end sealed section 42, further preferably such a position that the simple sealed sections 43 are formed on both sides of the composite liquid agent package 2. The fusion bonding between the fused sealant and the sealant of the inner layer of the strip-shaped base material in the bag shape formation step (iii) is preferably performed concurrently with the lateral sealing.

Each step of the foregoing method is repeated continuously. Thus, in consideration of the single multicomponent liquid composition preparing kit, the lower end section 40 is formed by the lateral sealing in the step (iii) performed for the first time, and the upper end section 42 is formed by the lateral sealing in the step (iii) performed for the second time. By performing the bag shape formation step (iii), moreover, a product having many of the pillow flat bags connected together is obtained (with the tubular body being partitioned, like joints, with a plurality of lateral seals). To obtain the individual multicomponent liquid composition preparing kits, therefore, the tubular body needs to be cut laterally to form the multicomponent liquid composition preparing kits. At this time, lateral sealing is performed such that the vertical width of the lateral seal in the step (iii) will be the sum of the vertical width of the lower end section and the vertical width of the upper end section, where after cutting is performed such that the upstream vertical width of the lateral seal will become the vertical width of the lower end section. As a result, the pillow flat bag is cut off. Such a procedure is preferred, because the formation of the lower end section in the single multicomponent liquid composition preparing kit and the formation of the upper end section in the next multicomponent liquid composition preparing kit can be performed at a stroke by performing the step (iii) once.

EXPLANATIONS OF LETTERS OR NUMERALS

1: Multicomponent liquid composition preparing kit
1A: Multicomponent liquid composition preparing kit
1B: Multicomponent liquid composition preparing kit
2: Composite liquid agent package
3: Outer bag
10: Heat-sealable laminated film
11: Inner layer
12: Outer layer
22: Extended-out sealant
36: Heat-sealable laminated film
38: Back sealed section
40: Lower end sealed section (one end section)
42: Upper end sealed section (opposite end section)
43: Simple sealed section
44: Weakened line
46: Notch
48: Applicator insertion opening
100: Composite liquid agent package
144: Weakened line
146: Notch
148: Applicator insertion opening
200: Liquid agent housing portion
200a: First liquid agent housing portion
200b: Second liquid agent housing portion
210: Pouch
211: One end section of pouch
212: Opposite end section of pouch
213: Back sealed section
214: Penetrating opening
244: Weakened line
248: Applicator insertion opening
300: Binding portion
320: Fused sealant

The invention claimed is:

1. A composite liquid agent package comprising a plurality of liquid agent housing portions and a binding portion, all of the plurality of liquid agent housing portions being bound together by the binding portion for integration, wherein
each of the plurality of liquid agent housing portions includes
a pouch constituted by a heat-sealable laminated film or heat-sealable laminated sheet including at least an inner layer composed of a sealant and an outer layer composed of a sheathing material, the pouch having one end section and an opposite end section which are sealed sections formed by heat-sealing ends of the heat-sealable laminated film or heat-sealable laminated sheet; and
a liquid agent held within the pouch airtightly and liquidtightly, the one end section is sealed so that it can be opened by applying a pressing force on the liquid agent filled in the pouch, the liquid agents held in the plurality of liquid agent housing portions are the same with or different from each other, and at an extremity of each of the opposite end sections of the plurality of liquid agent housing portions, a part of the sealant constituting the inner layer of the heat-sealable laminated film or heat-sealable laminated sheet constituting the liquid agent housing portion is extended outwardly of an extremity of the outer layer while keeping integral with a remaining part of the sealant to form an extended-out sealant, and the extended-out sealants are fusion-bonded together and integrated thereby to form a fused sealant, which constitutes the binding portion or a main part thereof.

2. The composite liquid agent package according to claim 1, adapted to store constituent components of a multicomponent liquid composition, which exhibits a predetermined function, integrally in separate packages containing two or more liquid agents, respectively.

3. The composite liquid agent package according to claim 2, wherein the multicomponent liquid composition is a dental adhesive composition.

4. The composite liquid agent package according to claim 1, wherein the pouch in each of the plurality of liquid agent housing portions is a pillow flat bag.

5. A method for manufacturing the composite liquid agent package according to claim 4, wherein the pillow flat bag comprises a lower end side heat-sealed section as the one end section, an upper end side heat-sealed section as the opposite end section and a back sealed section on a back surface of the pillow flat bap, and the method comprises:
providing the plurality of liquid agent housing portions by:
continuously forming a tube with the heat-sealable laminated film or heat-sealable laminated sheet while continuously supplying the heat-sealable laminated film or heat-sealable laminated sheet;
heat-sealing both side ends of the heat-sealable laminated film or heat-sealable laminated sheet along a flow direction in which the heat-sealable laminated film or heat-sealable laminated sheet is supplied, to form the back sealed section, thereby forming a tubular body;
heat-sealing the tubular body in a direction orthogonal to the flow direction to form the lower end side heat-sealed section;
filling the liquid agent into the tubular body closed at the lower end side heat-sealed section;
after paying out the tubular body filled with the liquid agent by a predetermined length, heat-sealing the tubular body filled with the liquid agent again in the direction orthogonal to the flow direction to form the upper end side heat-sealed section; and
cutting off the pillow flat bag holding the liquid agent airtightly and liquidtightly; and then
joining the plurality of liquid agent housing portions by superposing all of the opposite end sections of the plurality of liquid agent housing portions, and heating and pressurizing superposed regions of all the opposite end sections overlapping, to extrude a part of the sealant, which constitutes the inner layer in the superposed region of each of the opposite end sections, outwardly from an extremity of the outer layer of each of the opposite end sections, while fusion-bonding together extended-out sealants formed from the extruded part of the sealant.

6. The method according to claim 5, wherein in providing the liquid agent housing portions, protrusions and depressions are provided in the upper end side heat-sealed section serving as the opposite end section, and a thickness of the sealant in each of the protrusions is larger than a thickness of the inner layer of the heat-sealable laminated film or heat-sealable laminated sheet.

7. The composite liquid agent package according to claim 1, wherein a penetrating opening is formed in the opposite end section of each of the plurality of liquid agent housing portions, and each of the extended-out sealants fusion-bonded together in the binding portion includes the sealant extended out from a peripheral edge of the penetrating opening formed in the opposite end section of each of the plurality of liquid agent housing portions toward an interior of the penetrating opening.

8. A kit for storing constituent components of a multi-component liquid composition, which exhibits a predetermined function, in separate packages containing two or more liquid agents, respectively, and for mixing, when in use, the liquid agents divided into the separate packages to prepare the multicomponent liquid composition, the kit including the composite liquid agent package according to claim 2, and an outer bag for fixing the composite liquid agent package inside and housing it airtightly, wherein the outer bag has a liquid reservoir space capable of holding all the liquid agents, which flow out when the liquid agents held in the liquid agent housing portions of the composite liquid agent package fixed and housed inside are flowed out from the one end sections of the liquid agent housing portions by application of a pressing force to the liquid agents, without bringing the liquid agents into contact with the composite liquid agent package.

9. The kit according to claim 8, wherein the outer bag is constituted by a heat-sealable laminated film or heat-sealable laminated sheet including at least an inner layer comprising a sealant and an outer layer comprising a sheathing material, and fixing of the composite liquid agent package to an interior of the outer bag is performed at a site of fusion bonding where the sealant constituting the inner layer of the outer bag and the sealant integrated in the binding portion in the composite liquid agent package are fusion-bonded together.

10. The kit according to claim 9, wherein the pouch in each of the liquid agent housing portions of the composite liquid agent package is a pillow flat bag, the outer bag is a pillow flat bag having an upper end sealed section, a lower end sealed section, and an outer bag back sealed section formed by heat sealing at an upper end section, a lower end section, and a back thereof, respectively, a width of the pillow flat bag constituting the outer bag is larger by a predetermined length than a width of the pillow flat bag constituting the pouch in each of the liquid agent housing portions, fixing of the composite liquid agent package to the interior of the outer bag is performed such that the site of fusion bonding is disposed, with one side end of the pillow flat bag constituting each of the pouches of the composite liquid agent package being parallel, at a predetermined space interval, to a side end, on a same side, of the pillow flat bag constituting the outer bag, in the upper end sealed section of the outer bag; and that a simple sealed section, where the sealant constituting the inner layer of the outer bag are fusion-bonded together, is formed in a region beside at least one side end of the upper end sealed section, a front wall and a back wall, which face each other, of the pillow flat bag constituting the outer bag are formed with (1) a first weakened line starting at a starting point located near an upper end edge of the simple sealed section of the upper end sealed section, and ending at an ending point located close to an upper part of a side end edge beside the simple sealed section in the outer bag; (2) a second weakened line starting at a starting point located near the upper end edge of the simple sealed section of the upper end sealed section, and ending at an ending point located close to the upper part of the side end edge on an opposite side of the simple sealed section in the outer bag; or (3) a third weakened line starting at a starting point located close to the upper part of the side end edge on one side, and ending at an ending point located close to the upper part of the side end edge on an opposite side, and the first weakened line, the second weakened line or the third weakened line is broken to remove a part above the first weakened line, the second weakened line or the third weakened line in the outer bag, whereby an applicator insertion opening is formed.

11. The kit according to claim 10, wherein each of the front wall and the back wall is formed with two of the first weakened lines (1) or two of the second weakened lines(2), and the two of the first weakened lines or the two of the second weakened lines on the front wall merge the two of the first weakened lines or the two of the second weakened lines on the back wall at or vicinity of the ending points of the two of the first weakened lines or the two of the second weakened lines on the front wall and the ending points of the two of the first weakened lines or the two of the second weakened lines on the back wall.

12. The kit according to claim 10, wherein each of the front wall and the back wall is formed with two of the first weakened lines (1) or two of the second weakened lines(2), and auxiliary weakened lines connecting the two of the first weakened lines or the two of the second weakened lines on the front wall to the two of the first weakened lines or the two of the second weakened lines on the back wall are formed vicinity of the ending points of the two of the first weakened lines or the two of the second weakened lines on the front wall and the ending points of the two of the first weakened lines or the two of the second weakened lines on the back wall.

13. The kit according to claim 10, wherein the second weakened line (2) or the third weakened line (3) is formed, and when the second weakened line or the third weakened line is broken to remove the part above the second weakened line or the third weakened line, a remaining part of the composite liquid agent package which remains after outflow of the liquid agents is removed together with the part above the second weakened line or the third weakened line in the outer bag.

14. The kit according to claim 8, wherein a volume of a space between the outer bag and the composite liquid agent package is 1 to 70% of a maximum volume of the space.

15. A method for manufacturing the kit according to claim 10, comprising a temporary fixing step of placing a strip-shaped base material, which comprises a heat-sealable laminated film or heat-sealable laminated sheet including at least an inner layer composed of a sealant and an outer layer composed of a sheathing material, such that the inner layer becomes an upper surface, arranging a plurality of the composite liquid agent packages on the upper surface, at predetermined space intervals in a longitudinal direction of the strip-shaped base material, at a widthwise center or at nearly the widthwise center of the strip-shaped base material such that the opposite end sections of the pouches in the liquid agent housing portions of the composite liquid agent package are orthogonal to a length direction of the strip-shaped base material, and temporarily fixing the packages;

a tubulation step of heat-sealing both side end section regions of the strip-shaped base material, which has the plurality of composite liquid agent packages temporarily fixed thereto at the predetermined space intervals as a result of the temporary fixing step, in such a manner as to be parallel to the length direction, thereby joining them together to obtain a tubular body having the composite liquid agent packages arranged and temporarily fixed inside at the predetermined space intervals; and a bag shape formation step of heat-sealing a part, between the composite liquid agent packages temporarily fixed adjacent to each other, of the tubular body obtained in the tubulation step in a direction orthogonal to the longitudinal direction, thereby joining the part, and cutting a center or nearly the center of the joined part in the direction orthogonal to the longitudinal direction to obtain a pillow flat bag housing the single composite liquid agent package, the method further comprising fusion bonding an integrated fused sealant in the binding portion of the temporarily fixed composite liquid agent package, and the sealant constituting the inner layer of the strip-shaped base material to each other, during heat sealing in the bag shape formation step.

16. The method according to claim 15, further comprising a weakened line formation step of irradiating a predetermined position of the strip-shaped base material with a laser beam, thereby reducing a thickness of the strip-shaped base material to form the first weakened line, the second weakened line or the third weakened line, prior to the bag shape formation step.

\* \* \* \* \*

UNITED STATES PATENT AND TRADEMARK OFFICE
CERTIFICATE OF CORRECTION

PATENT NO. : 11,939,136 B2
APPLICATION NO. : 17/423048
DATED : March 26, 2024
INVENTOR(S) : Kazuhiko Okishio et al.

It is certified that error appears in the above-identified patent and that said Letters Patent is hereby corrected as shown below:

In the Claims

Column 25, Line 34, (Claim 5), delete "the pillow flat bap" and insert --the pillow flat bag--.

Signed and Sealed this
Third Day of September, 2024

Katherine Kelly Vidal
*Director of the United States Patent and Trademark Office*